United States Patent [19]
Harter et al.

[11] Patent Number: 6,034,975
[45] Date of Patent: Mar. 7, 2000

[54] HIGH POWER, PASSIVELY MODELOCKED FIBER LASER, AND METHOD OF CONSTRUCTION

[75] Inventors: Donald J. Harter; Martin E. Fermann; Min Jiang, all of Ann Arbor, Mich.

[73] Assignee: Imra America, Inc., Ann Arbor, Mich.

[21] Appl. No.: 09/040,252

[22] Filed: Mar. 9, 1998

[51] Int. Cl.[7] .................................................. H01S 3/098
[52] U.S. Cl. .................................. 372/18; 372/6; 372/27; 372/92
[58] Field of Search .................................. 372/18, 6, 27, 372/92

[56] References Cited

U.S. PATENT DOCUMENTS

| | | | |
|---|---|---|---|
| 3,409,843 | 11/1968 | Bowness . | |
| 3,584,312 | 6/1971 | Statz | 372/92 |
| 3,729,690 | 4/1973 | Snitzer . | |
| 3,801,931 | 4/1974 | Heflinger et al. . | |
| 3,928,818 | 12/1975 | White . | |
| 3,978,429 | 8/1976 | Ippen et al. | 372/18 |
| 4,864,577 | 9/1989 | Aoshima et al. . | |
| 5,005,175 | 4/1991 | Desurvire et al. . | |
| 5,008,887 | 4/1991 | Kafka et al. | 372/6 |
| 5,050,183 | 9/1991 | Duling, III | 372/6 |
| 5,136,598 | 8/1992 | Weller et al. . | |
| 5,163,059 | 11/1992 | Negus et al. | 272/18 |
| 5,189,676 | 2/1993 | Wysocki et al. . | |
| 5,222,089 | 6/1993 | Huber | 372/6 |
| 5,272,560 | 12/1993 | Baney et al. . | |
| 5,303,314 | 4/1994 | Duling, III et al. . | |
| 5,311,603 | 5/1994 | Fidric . | |
| 5,361,161 | 11/1994 | Baney et al. . | |
| 5,436,925 | 7/1995 | Lin et al. | 372/92 |
| 5,448,579 | 9/1995 | Chang et al. | 372/18 |
| 5,450,427 | 9/1995 | Ferman et al. | 372/6 |
| 5,513,194 | 4/1996 | Tamura et al. | 372/6 |
| 5,617,434 | 4/1997 | Tamura et al. | 372/18 |
| 5,689,519 | 11/1997 | Fermann et al. | 372/18 |
| 5,995,175 | 4/1991 | Desurvire et al. | 372/6 |

OTHER PUBLICATIONS

Snitzer, "Proposed Fiber Cavities for Optical Masers", *Journal of Applied Physics*, vol. 23, No. 1, Jan. 1960, pp. 36–37.

Koester, et al., "Amplification in a Fiber Laser", *Applied Optics*, vol. 3, No. 10, Oct. 1963, pp. 1182–1186.

Manni, "Two–Photon Exitation Expands the Cabibilities of Laser–Scanning Microscopy", *Biophotonics International*, Jan./Feb. 1996, pp. 44–48, 50 and 52.

Krasinski, et al., "Multipass Amplifiers Using Optical Circulators", IEEE Journal of Quantum Electronics, vol. 26, No. 5, May 1990, pp. 950–958.

Tamura, et al., "Unidirectional ring resonators for self–starting passively mode–locked lasers", Optics Letters, vol. 18, No. 3, Feb. 1, 1993, pp. 220–222.

Ober, et al., "42–fs pulse generation from a mode–locked fiber laser started with a moving mirror", Optics Letters, vol. 18, No. 5, Mar. 1, 1993, pp. 367–369.

Hofer, et al., "Mode locking with cross–phrase and self phrase modulation, " Optics Letters, vol. 16, No. 7, Apr. 1, 1991, pp. 502–504.

Hofer, et al., "Characterization of Ultrashort Pulse Formation in Passively Mode–Locked Fiber Lasers", IEEE Journal of Quantum Electronics, vol. 28, No. 3, Mar. 1992, pp. 720–728.

Ippen, et al., "Additive pulse mode locking", Optical Society of America, vol. 6, No. 9, Sep. 1989, pp. 1736–1745.

(List continued on next page.)

*Primary Examiner*—Leon Scott, Jr.
*Attorney, Agent, or Firm*—Knobbe, Martens, Olson & Bear, LLP

[57] ABSTRACT

The output power of a passively modelocked fiber laser is increased by distributing optical losses throughout the cavity. The laser cavity includes a saturable absorber and a polarizing element that serves as the output coupler, and these are positioned on opposite sides of the fiber gain medium. The pump light is preferably injected towards the side of the laser cavity that includes the saturable absorber. The laser cavity compensates for polarization drifts and is environmentally stable.

45 Claims, 5 Drawing Sheets-

OTHER PUBLICATIONS

Taverner, et al., "Polarization Maintaining Figure–8 Laser", believed to have been presented at the Optical Society America Top. Meeting oin Nonlinear Guided Wave Phenomena, Cambridge, 1993, paper WC3.

Duling, III, et al., "A Single–Polarization Er–Doped Fiber Amplifier", believed to have been presented at a conference on Lasers and Electr–Optics, vol. 12 of 992 OSA Tech. Digest Series, paper CPDP 28. (1992).

Krausz, et al., "Passive mode locking in standing–wave laser resonators", Optics Letters, vol. 18, No. 11, Jun. 1, 1993, pp. 888–890.

Tamura, et al., "77–fs pulse generation from a stretched–pulse mode–locked all fiber ring laser", Optics Letters, vol. 18, No. 13, Jul. 1, 1993, pp. 1080–1082.

Kelly, "Characteristic sideband instability of the periodically amplified average soliton", believed to come from Electronic Letters, vol. 28, No. 806 (1992), pp. 1–8.

Menyk, "Stability of solitons in birefringent optical fibers. II. Arbitrary amplitudes", Optical Society of America, vol. 5, No. 2, Feb. 1988, pp. 392–402.

Fermann, et al., "Additive–pulse–compression mode locking of a neodymium fiber laser", Optical Letters, vol. 16, No. 4, Feb. 15, 1991, pp. 244–246.

Fermann, et al., "Passive mode locking in erbium fiber lasers with negative group delay", American Institute of Physics, Mar. 1, 1993, pp. 910–912.

Duling, III, "All–fiber ring soliton laser mode locked with a nonlinear mirror", Optics Letters, vol. 16, No. 8, Apr. 15, 1991, pp. 539–541.

Walling, et al., "Tunable Alexandrite Lasers: Development and Performance", IEEE Journal of quantum Eletronics, vol. QE–21, No. 10, Oct. 1985, pp. 1568–1581.

Harter, et al., "Low–magnification unstable resonators used with ruby and alexandrite lasers", Optics Letters, vol. 11, Nov. 1986, pp. 706–708.

Harter, et al., "Femtosecond to Nanosecond High–Intensity Lasers and Applications", SPIE–The International Society of Optical Engineering, vol. 1229, Jan. 17–18, 1990, Los Angeles, CA pp. 19–28.

Poole, et al., "Fabrication of Low–Loss Optical Fibers Containing Rare–Earth Ions", Electronic Letters, vol. 24, No. 17, Aug. 15, 1985.

Fermann, et al., "Passive mode locking by using nonlinear polarization evolution in a polarization–maintaining erbium–doped fiber", Optics Letters, No. 11, Jun. 1, 1993, pp. 894–896.

Morioka, et al., "Ultrafast Reflective Optical Kerr Demultiplexer Using Polarization rotation Mirror", *Electronics Letters*, vol. 28, No. 6, Mar. 12, 1992.

Duling, III, et al., "Single–Polarization Fibre Amplifier", Electronics Letters, vol. 28, No. 12, Jun. 4, 1992 3 pages.

Matas, et al., "Self–starting passively mode–locked Fabry–Per fiber soliton laser using nonlinear polarization evolution", Optoelectronics Research Centre, The University of Southampton, Southampton, Joint Symposium on Ultrafast Lasers 3, May 5, 1993, 2 pages.

Ober, et al., "Self–starting diode–pumped femtosecond Nd fiber laser", *Optical Society of America*, Received Sep. 15, 1993, 3 pages.

Fermann, et al., "Environmentally stable Kerr–type mode–locked erbium fiber laser producing 360–fs pulses", *Optical Society of America*, 1994.

Fermann, "Ultrashort–Pulse Sources Based on Single–Mode Rare–Earth–Doped Fibers", *Applied Physics B*, 1994.

Duling, III, "Compact sources of ultrashort pulses", date unknown, pp. 179–207.

Desurvire, et al., "High–gain erbium–doped traveling–wave fiber amplifier", *Optics Letters*, vol. 12, No. 11, pp. 888–890, Nov. 1987.

Reddy, et al. "A Turnkey 1.5 $\mu$m Picosecon d Er/Yb Fiber Laser", *Conference On Optical Fiber Communication*, OFC, paper PD17, 1993.

Loh, et al., "All–solid–state subpicosecond passively mode locked erbium–doped fiber laser", *Applied Physics Letters*, vol. 63, No. 1, pp 4–6 1993.

Loh, et al. "Diode–Pumped Sefstarting Passively Modelocked Neodymium–Deoped Fibre Laser", *Electronics Letters*, vol. 29, No. 9, Apr. 29, 1993, pp. 808–810.

HIGH POWER, PASSIVELY MODELOCKED FIBER LASER, AND METHOD OF CONSTRUCTION

BACKGROUND OF THE INVENTION

1. Field of the Invention

The present invention relates generally to an apparatus and method for generating short pulses of laser energy and, more particularly, to passively modelocked lasers for providing short pulses with enhanced power.

2. Description of the Related Art

Both actively and passively modelocked lasers are useful as short pulse sources, and frequently employ single-mode rare-earth doped fibers as the lasing material. To be reliable and therefore commercially practical, a fiber-based short pulse source must be environmentally stable, i.e. it should be substantially immune to environmental influences such as temperature drift and variations in pressure. Unfortunately, conventional fiber-based short pulse sources are susceptible to both temperature and pressure variations and require constant monitoring to maintain pulse generation.

The simplest methods for generating short laser pulses involve passive modelocking. (See, for example, U.S. Pat. No. 5,689,519 to Fermann et al. and U.S. Pat. No. 5,448,579 to Chang et al.) The three most common passive modelocking techniques involve either a saturable absorber inside the cavity, nonlinear polarization evolution, or a combination of both nonlinear polarization evolution and a saturable absorber. As discussed by Fermann et al., the exploitation of nonlinear polarization also favors the production of the shortest possible pulses. Environmentally-stable cavities that comprise a saturable absorber are most conveniently constructed in a Fabry-Perot cavity.

Passive modelocking techniques based upon saturable absorbers are the most promising and permit the construction of relatively simple and reliable cavities. Fiber lasers that use saturable absorbers have been described by Loh et al. ("All-solid-state subpicosecond passively mode locked erbium-doped fiber laser", Appl. Phys. Lett., vol. 63, pp. 4–6, 1993), Barnett et al. ("High-power erbium-doped fiber laser mode locked by a semiconductor saturable material") and Reddy et al. ("A turnkey 1.5 micron picosecond Er/Yb laser"). However, these designs suffer from polarization instabilities.

Another shortcoming with current modelocked designs is the inefficiency with which power is coupled out of the cavity. For example Barnett et al., Reddy et al., and Loh et al. describe systems in which the 4% reflecting end of an uncoated fiber is used as the output coupler. While this simplifies the cavity design, it does not optimize the laser performance with respect to stability and output power. Further, in Tamura et al. (U.S. Pat. No. 5,513,194), a design for optimizing the output power is described, but this design is not environmentally stable and does not include a saturable absorber.

In general, one shortcoming in the prior art is that output power is not optimized with respect to the pump power. However, to minimize the cost of a passively modelocked fiber laser, the output power of the fiber laser with respect to available pump power should be maximized, since the pump laser is often the most expensive component in a fiber laser system.

Thus, there remains a need for a mode-locked laser device that is environmentally stable, free of polarization instabilities, and energy efficient, thus giving enhanced power.

SUMMARY OF THE INVENTION

In one embodiment of the invention, a Fabry-Perot cavity for modelocking is disclosed in which a saturable absorber and an output coupler are located at opposite ends of the laser cavity, and further, pump light is injected in the cavity towards the saturable absorber. With this arrangement, optical loss is distributed in the cavity in a way that enhances the outcoupled power. The laser cavity preferably also contains two Faraday rotators to compensate for polarization drifts in the cavity, as well as waveplates and a polarizer which together control the output coupling by varying the polarization of the light within the cavity. The output from the cavity is the light which reflects off of the polarizer, which has a well-defined, time-invariant output polarization.

In an exemplary embodiment, a passively modelocked erbium fiber laser is constructed from negative-dispersion fiber (soliton-supporting fiber). Using a pump power of 100 mW at a wavelength of 980 nm, 300–600 fsec near-bandwidth-limited pulses with an average power of 15 mW are obtained at a repetition rate of 50 MHz.

One advantage of the modelocked laser cavity disclosed herein is that it is environmentally stable. Another advantage of the modelocked laser cavity is that it is insensitive to polarization effects. Yet another advantage is that it provides more output power for a given pump power.

One preferred embodiment of the invention is a method of producing modelocked laser output from an optical cavity having a gain medium, in which the method comprises amplifying an optical signal in the gain medium to produce an amplified optical signal, directing the amplified optical signal through a saturable absorber to produce a modelocked optical signal, amplifying the modelocked optical signal in the gain medium to produce an amplified modelocked optical signal, and outcoupling a fraction of the amplified modelocked optical signal with a polarizing element.

Another preferred embodiment of the invention is an optical cavity for a short pulse modelocked fiber laser, in which the cavity comprises first and second reflectors which are each at least partially reflecting and respectively define first and second ends of the cavity. The cavity further comprises a fiber including a gain medium disposed between the first and second cavity ends, as well as a pump signal injector connected to introduce pump light into the fiber toward the first cavity end, in which the pump light excites the gain medium to produce a laser signal. The cavity also comprises a saturable absorber proximate the first cavity end for inducing modelocking of the laser signal, and an output coupler proximate the second cavity end for outcoupling a portion of the laser signal in the form of short output pulses.

DETAILED DESCRIPTION OF THE PREFERRED EMBODIMENT

Figure 1:
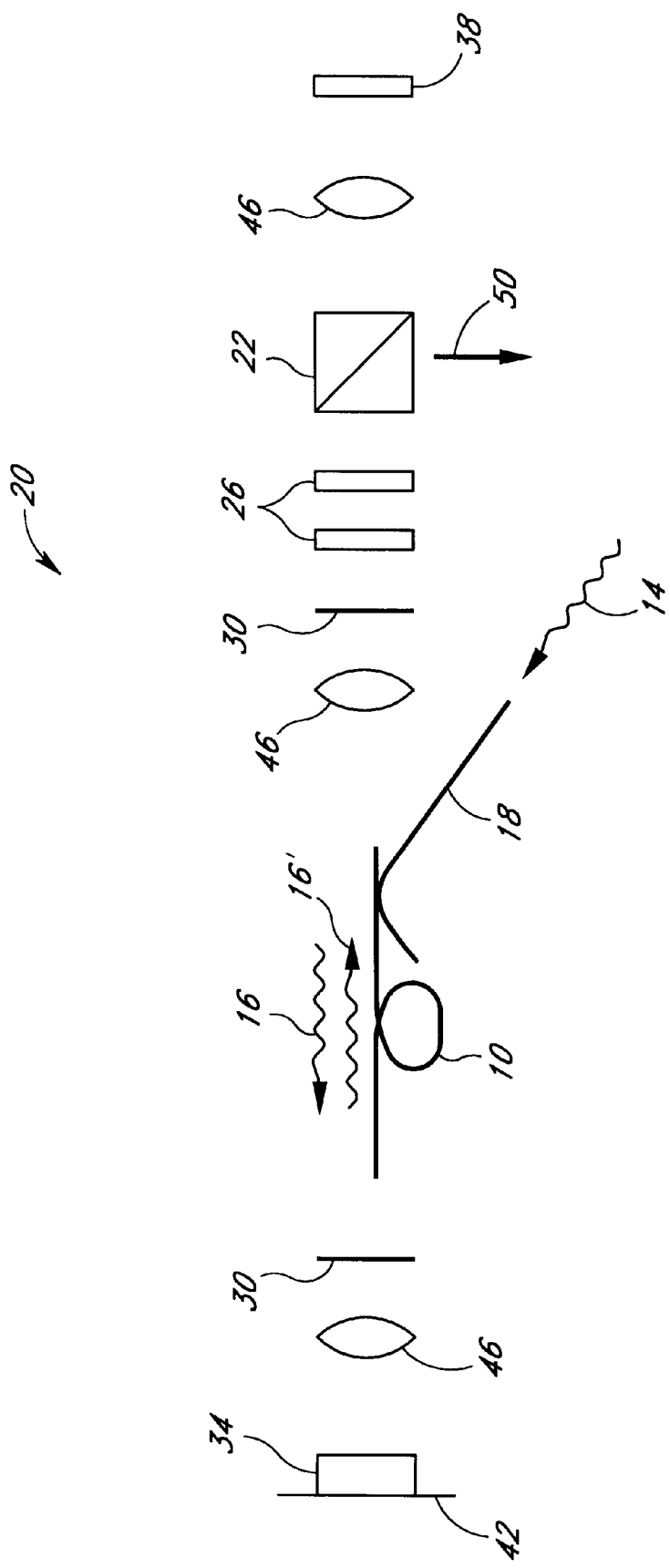
FIG. 1 is a preferred embodiment of the present invention, in which a laser cavity includes a saturable absorber and an output coupler located on opposite sides of a fiber gain medium.

A preferred embodiment of the invention is shown in FIG. 1, which includes a fiber gain medium 10 such as a 1.5 m length of Er³+-doped optical amplifier fiber. In one preferred embodiment, the fiber 10 has a cut-off wavelength of 1400 nm, a numerical aperture NA=0.16, and a dispersion of ≈−20.000 fsec²/m. The half-width diameter of the fiber mode intensity is estimated as ≈8 μm. The fiber 10 is doped with ≈1000 parts per million (mole ppm) erbium and has an absorption of about 35 dB/m at the peak erbium absorption wavelength of 1530 nm. Although the present invention is described herein principally with respect to erbium, other rare-earth-elements (e.g., ytterbium) can be used as dopants.

Pump light 14 (preferably from a laser source, which is not shown in the figures) with a wavelength near 980 nm is preferably directed into the erbium fiber 10 via a pump signal injector 18 (connected to the fiber), such as a wavelength-division multiplexer (WDM), as shown in the exemplary cavity 20 of FIG. 1. The pump light 14 optically excites erbium atoms in the fiber 10. However, other techniques can be used to pump a fiber laser, e.g., high power fiber lasers can be constructed by employing double-clad fibers pumped by high-power diode lasers. A polarizing element 22 such as a polarizing beam-splitter cube or polarization beam splitter serves as the output coupler for a short pulse modelocked fiber laser signal 16, 16' (in which 16 and 16' designate the leftward travelling and rightward travelling portions of the laser signal, respectively), and the respective orientations of two waveplates 26 control the polarization evolution inside the cavity 20 and thus the level of output coupling. The laser signal 16, 16' results from stimulated emission of excited erbium. Two Faraday rotators 30 within the cavity 20 (i.e., proximate the ends of the cavity), which are preferably located on opposite sides of the fiber 10, compensate for polarization drifts inside the cavity.

When the pump light 14 is injected into the cavity 20, it propagates towards a saturable absorber 34, which may have a round trip unsaturated loss of about 50%. The saturable absorber 34 is preferably InGaAsP attached to (i.e., disposed directly on) a reflector such as a totally reflecting mirror 42, which together with a second highly reflecting mirror 38 (or reflector) defines the extent of (i.e., the ends of) the optical cavity 20. The saturable absorber 34 induces modelocking of the laser signal 16, 16' and preferably has a bandedge of 1.55 μm, a carrier life-time of 5 psec, and a saturation energy density of 1 Watt/m². However, other saturable absorbers with appropriate carrier-life-times, saturation energies and band-edges may be used, as is known in the art.

A focusing lens 46 (between the saturable absorber 34 and the fiber 10) preferably yields a spot diameter of about 10 μm on the saturable absorber, so that the corresponding saturation energy of the absorber is about 80 pJ, which is typically lower than the intra-cavity energy of the circulating pulses inside the cavity 20. Other focusing lenses 46 in the cavity 20 aid in better imaging the laser signal 16, 16' onto the fiber 10. The total intra-cavity fiber length within the cavity 20 is preferably 2 m, and the signal laser preferably operates at a repetition rate of 50 MHz. The average pump laser power is preferably 100 mW and, in this embodiment, results in a laser signal output power from the cavity 20 of approximately 15 mW. The resulting modelocked pulses are near bandwidth-limited with a pulse width ranging from 300–600 fsec depending on the exact settings of the polarization controlling elements and the degree of output coupling.

To maximize the output power of a passively modelocked laser in the presence of a saturable absorber, two conditions must be fulfilled:

1) the signal saturation power (defined herein as the output power of the amplifier when its small signal gain is down by 3 dB from its maximum) should be maximized at the output coupler, and 2) the intensity on the saturable absorber should be maximized, i.e. the saturable absorber should be as saturated as possible.

Condition 1) is ensured for a three-level laser system by maximizing the pump laser power in front of the output coupler, whereas condition 2) is ensured (for any laser system) by maximizing the signal intensity in front of the saturable absorber.

Since an erbium amplifier can be approximated as a three-level laser system (see, for example, Desurvire et al., "High-gain erbium-doped traveling-wave fiber amplifier", Optics Letters, vol. 12, pp. 888–890, 1987), the power of the laser signal 16, 16' that saturates the erbium amplifier fiber 10 is proportional to the pump power. Thus, to generate the maximum laser signal power, the direction of the pump light in the cavity 20 is chosen to be contra-directional to the propagation direction of that portion 16' of the laser signal propagating towards the output coupler 22, i.e. the pump light is injected towards an end of the cavity but away from the output coupler 22.

More specifically, in the Fabry-Perot cavity 20 of FIG. 1, some of the laser signal 16' is coupled out (indicated by the arrow 50) at the polarizing element 22, and a fraction is re-directed towards the erbium-doped fiber 10 upon reflection at the mirror 38, propagating past the WDM 18 towards the saturable absorber 34 along a first leg of propagation (i.e., from right to left in FIG. 1). After reflecting off of the mirror 34, the laser signal 16' propagates along a second, return leg (left to right) through the fiber 10 towards the output coupler 22. The direction of propagation of the pump light 14 is the same as that of the laser signal 16 in the right-to-left leg. However, the pump light 14 is contra-directional to the laser signal 16' in the second leg. For maximum output power from the laser signal 16', the cavity loss due to output coupling should be higher than the loss due to the saturable absorber 34, and in this embodiment, the laser signal intensity is higher in the second leg of propagation.

Condition 2) is satisfied by the embodiment of FIG. 1 since the loss α of a saturable absorber decreases with light intensity I, in accordance with the formula $$\alpha(I) = \alpha/(1 + I/I_{sat}), \quad (1)$$

where $I_{sat}$ is the saturation intensity of the absorber. Thus, the higher the intensity in front of the saturable absorber 34, the lower is the round trip cavity loss, meaning that more power can be extracted from the cavity.

Figure 2:
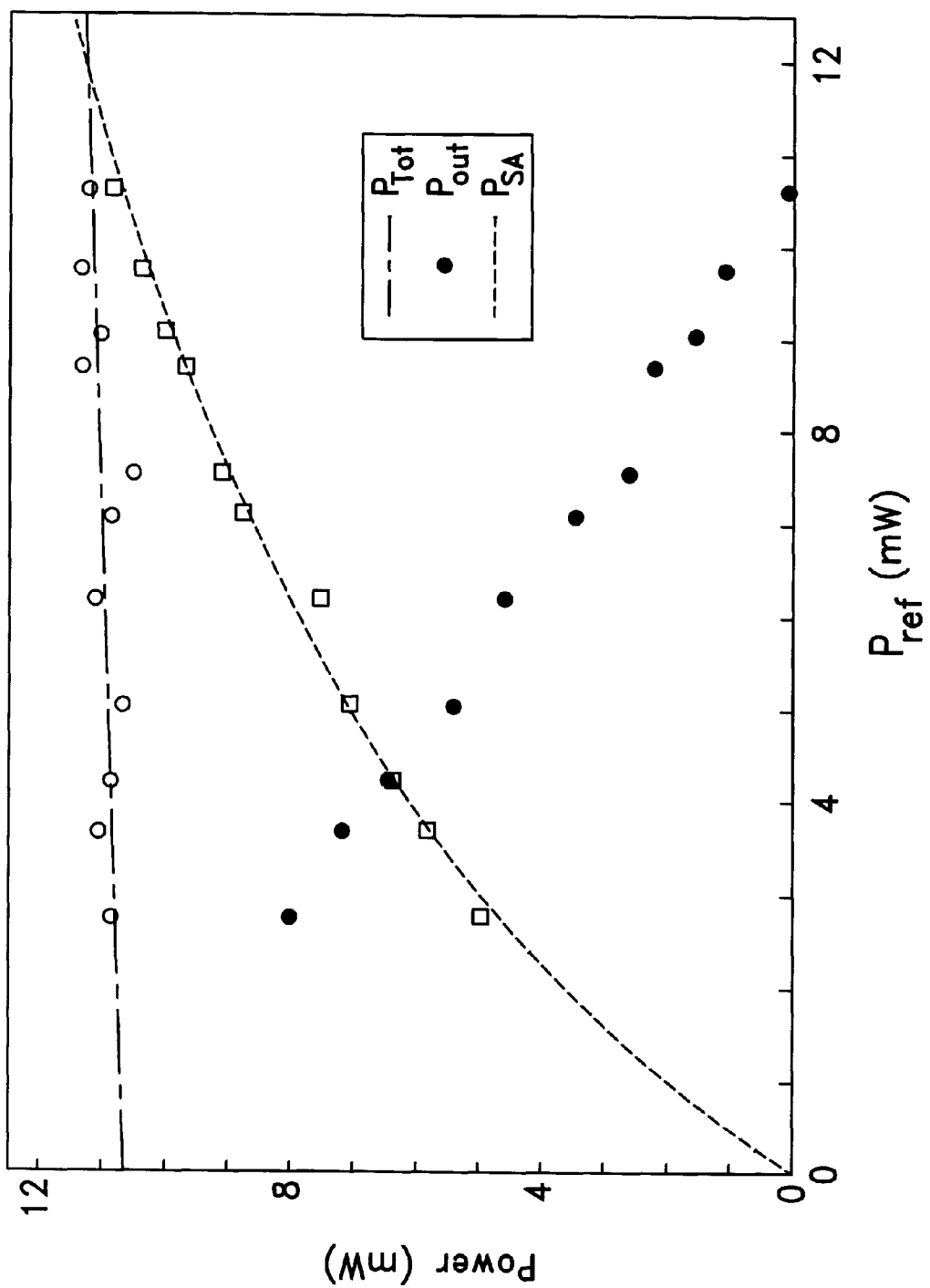
FIG. 2 shows experimental data that demonstrate that the configuration of FIG. 1 results in enhanced laser output power.
Figure 3A:
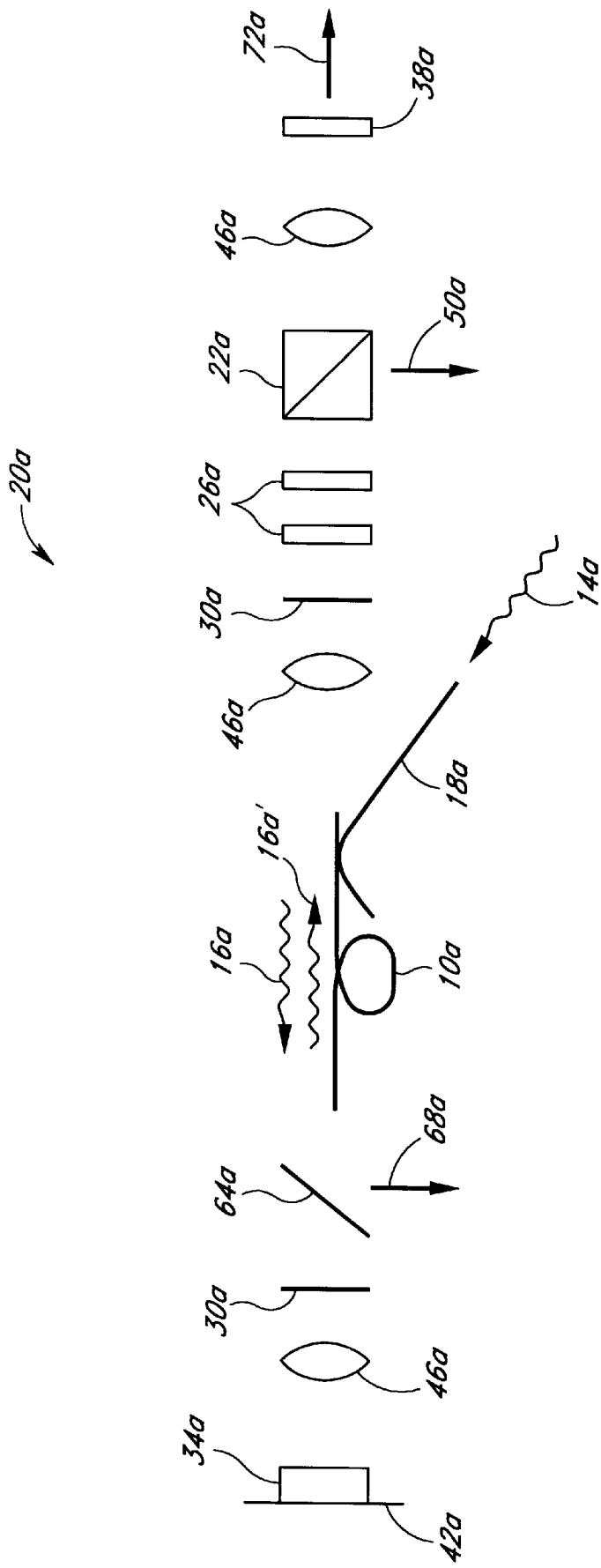
FIG. 3a shows a test setup that was used to collect the data of FIG. 2, this test setup being designed to determine the performance of the laser cavity of FIG. 1.

FIG. 3a illustrates a test setup on which the embodiment of FIG. 1 is altered to include a pellicle beamsplitter 64a to test the power level at the saturable absorber 34a. In addition, mirror 38 is replaced with a partially transmitting mirror 38a, so that the intracavity power at the other end of the cavity can also be monitored. The results indicated in FIG. 2 were obtained with the test setup of FIG. 3a and illustrate the relevance of condition 2) to cavity performance.

Figure 3B:
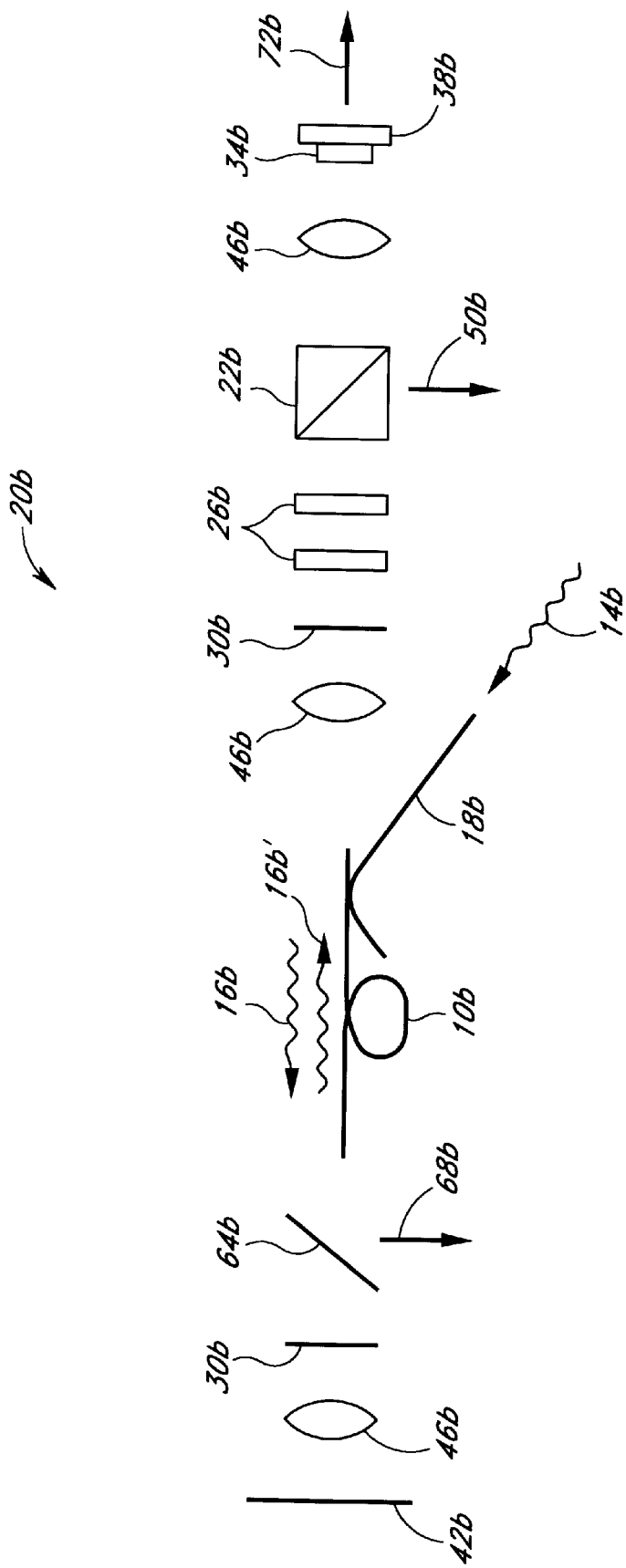
FIGS. 3b and 3c show test setups designed to determine the performance of laser cavities in the prior art.
Figure 3C:
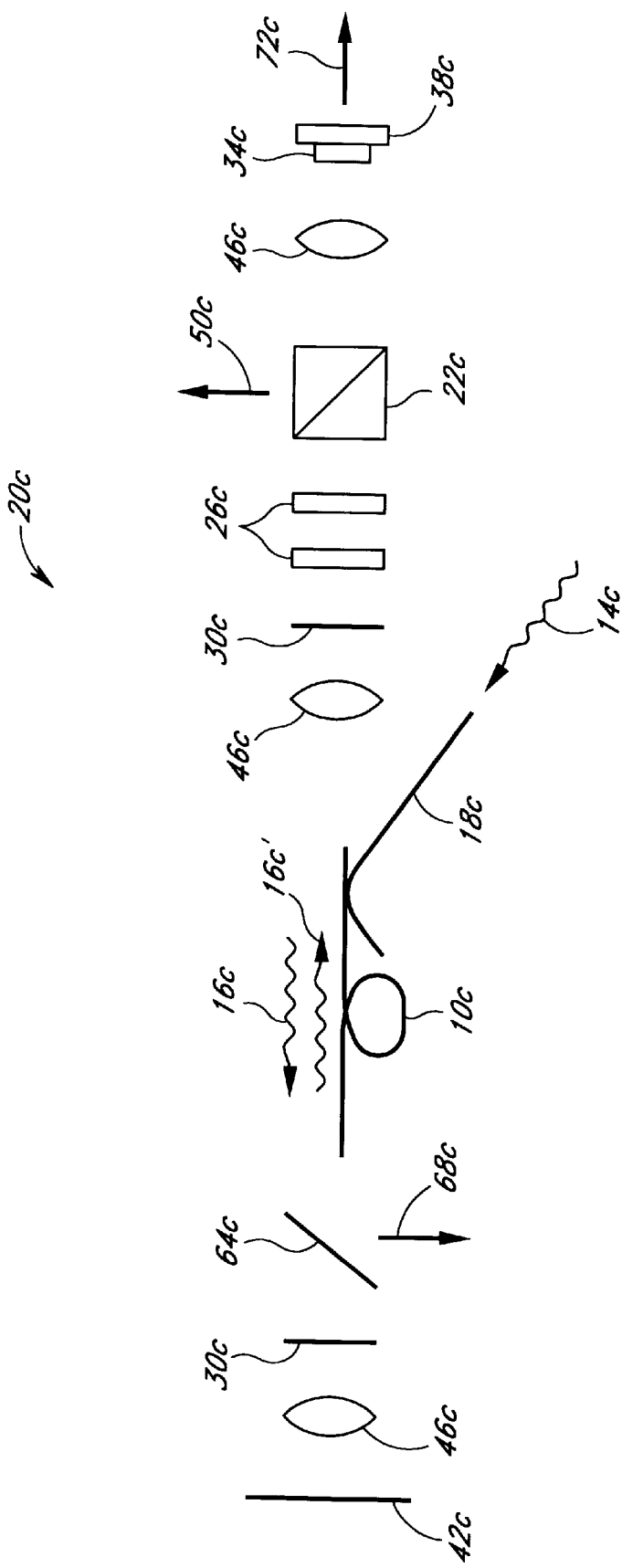

In FIGS. 3a, 3b, and 3c, parts analogous to those in FIG. 1 are designated with like numerals followed by the letters a, b, and c, respectively. The intra-cavity polarizing element 22a served as the output coupler, with the amount of output coupling being varied by adjusting the polarization of the laser signal 16a, 16a' inside the cavity 20a with the waveplates 26a. In these cavity characterization studies, a pump light power of about 60 mW was used.

The pellicle beamsplitter 64a near the saturable absorber 34a permits the intensity of the laser signal 16a striking the saturable absorber to be monitored. The beamsplitter 64a preferably has a reflectivity of about 1%. The power of the laser signal 16a in the cavity at this point (designated as $P_{sa}$ in FIG. 2) can be determined by measuring the power outcoupled from the cavity 20a by the pellicle beamsplitter 64a (this outcoupled power is indicated in FIG. 3a by the arrow 68a) and correcting for the fraction which is outcoupled. Likewise, at the opposite end of the cavity 20a, the power of the laser signal 16a' reflected off of the mirror 38a and directed back into the fiber 10a is monitored by recording the laser signal power that leaks through the mirror 38a (this outcoupled power is indicated by the arrow 72a) and correcting for the reflectivity of the mirror 38a (about 99% at the wavelength of interest). The power of the laser signal 16a' within the cavity 20a at mirror 38a (which upon reflection reenters the fiber 10a) is designated as $P_{ref}$ in FIG. 2. Also, the power of the laser signal 16a' outcoupled by the polarizing cube 22a is designated by $P_{out}$ and is indicated by the arrow 50a. Thus, the sum of $P_{ref}$ and $P_{out}$ is the total power of the intra-cavity laser signal 16a' generated just before output coupling at the polarizer 22a, and this sum is designated $P_{tot}$ in FIG. 2.

The data of FIG. 2 were recorded by varying the output coupling fraction while monitoring $P_{ref}$, $P_{out}$, and $P_{sa}$. In FIG. 2, $P_{out}$, $P_{sa}$, and $P_{tot}$ ($P_{tot}=P_{ref}+P_{out}$) are plotted against $P_{ref}$. $P_{out}$ is maximized when $P_{ref}$ is minimized, and conversely, when $P_{out}$ is minimized, $P_{ref}$ is maximized. $P_{tot}$ is constant at about 10.5 mW (here the pump laser power was about 60 mW) and does not depend on the amount of output coupling, indicating that the fiber laser 10a is heavily saturated. Also, when the output coupling is low (i.e. when $P_{out}$ is small), $P_{sa}$ is nearly equal to $P_{tot}$, which is expected since little laser signal power is lost at the polarizer 22a. The most significant aspect of FIG. 2 is that when $P_{out}$ is at a maximum, then $P_{sa}$ ($\approx$4.5 mW) is higher than $P_{ref}$ ($\approx$2.5 mW). Therefore, to optimize the power at the saturable absorber 34a, the saturable absorber and the output coupler 22a must be located at opposite ends of the cavity 20a.

Thus, the optical cavity 20 of FIG. 1 can be viewed from the standpoint of optical loss, in which the saturable absorber 34 removes (absorbs) a first percentage of light proximal to one end of the cavity to modelock the laser signal 16, 16', and the output coupler 22 polarizes and removes (outcouples) a second percentage of light proximal to or on the other end of the cavity, the first percentage being less than the second percentage. More specifically, the first percentage is between 10 and 60 percent, and the second percentage is above 60 percent. Further, distributing the optical loss throughout the cavity 20 in this manner does not substantially increase the pulse width of pulses from the modelocked laser signal 16, 16'.

To further illustrate the significance of condition 2) and the advantages of the invention disclosed herein, it is useful to consider the two cavity designs in the prior art illustrated in FIGS. 3b and 3c, which are seen to be non-ideal. In each of FIGS. 3a, 3b, and 3c, various possible locations of the saturable absorber and the output coupler are illustrated. In all cases contra-directional pumping is used. In FIGS. 3b and 3c, parts analogous to those in FIG. 3a are designated with like numerals followed by the letters b and c, respectively.

In FIG. 3b, the output coupler 22b and the saturable absorber 34b are located at the same end of the cavity 20b, with the output power being extracted in front of the saturable absorber 34b. This reduces the power on the saturable absorber 34b and, as a result, produces less output power, since the power striking the saturable absorber 34b is inadequate for efficient modelocking.

In an experimental implementation of FIG. 3b using cavity components like those for FIG. 3a, cavity 20b produced a power level of only 10 mW for a pump laser power of 100 mW, compared to the 15 mW (50% more power) obtained for the embodiment of FIG. 3a. The poorer performance of FIG. 3b can be explained as follows. In general, when an erbium fiber laser is heavily saturated, the amplifier gain is saturated after making just one pass through the fiber. Hence, the power at the output coupler is only weakly dependent on the loss of the saturable absorber, provided that there is sufficient power striking the saturable absorber to modelock the laser. Moreover, the signal power is maximized at the output coupler 22b and is higher than the signal power at the opposite end of the cavity 20b. Thus, positioning the saturable absorber 34b at the output coupler end leads to higher signal power loss than when the saturable absorber 34b and the output coupler 22b are located on opposite ends of the cavity 20b.

Moreover, from laser stability considerations, a certain minimum signal level is required on the saturable absorber. If the saturable absorber and the output coupler are at opposite ends of the cavity, the intensity on the absorber is maximized. In the embodiment of FIG. 3b, however, the signal intensity on the saturable absorber 34b is reduced, and thus the output coupling fraction must be reduced, which explains the lower output power of FIG. 3b.

In the cavity configuration of FIG. 3c, the output coupler 22c and the saturable absorber 34c are also located at the same end of the cavity 20c, but in this configuration the output 50c is taken after the laser signal 16c is reflected from the saturable absorber 34c. Although the power of the laser signal 16c' impinging on the saturable absorber 34c is maximized in this case, the available output power is reduced because of the high loss of the saturable absorber 34c. Since a saturable absorber always contains some non-saturable loss, it is clearly advantageous to extract power from a laser cavity before it passes through and is partially absorbed by the saturable absorber. In an implementation of FIG. 3c, cavity 20c produced a maximum cw power level of 10 mW (for a laser pump power of 100 mW), similar to the performance of its counterpart of FIG. 3b.

The available output power may be affected by factors other than from which direction the pump light is injected, and the respective locations of the saturable absorber and the output coupler. For example, nonlinear polarization evolution can also affect the available output power. However, the cavity design of FIG. 1 is advantageous in the presence of nonlinear polarization evolution, since it minimizes the loss of the cavity 20 and maximizes the output power. Also, the available output power is affected by fiber absorption, the fiber length, and the nonlinearity of the cavity, i.e by the nonlinear phase delay of the pulses inside the cavity. A typical value for a maximum permissible nonlinear phase delay is about 1–2$\pi$. If nonlinear considerations limit the output power, the intra-cavity pulse width can be increased, or fibers with a larger core area can be used to minimize the nonlinearity of the fiber.

In addition, chirped pulses can be made to oscillate within the laser cavity, thereby alleviating problems with self-phase modulation. Chirped pulses have a much longer pulse width compared to unchirped pulses and thus see a lower nonlinear phase delay. Chirped pulses can, for example, be generated by arranging the fibers inside the cavity to have overall positive dispersion.

Alternatively, the fiber length can be reduced so that the fiber laser operates at a higher repetition rate. However, to ensure energy conversion from the pump laser to the fiber laser, the fiber length should be long enough to absorb most of the pump power.

It should be understood that the scope of the present invention is not to be limited by the illustrations or the foregoing description thereof, but rather by the appended claims, and certain variations and modifications of this invention will suggest themselves to one of ordinary skill in the art.

What is claimed is:

1. An optical cavity for a short pulse modelocked fiber laser, comprising:

first and second reflectors which are each at least partially reflecting, respectively defining first and second ends of said cavity;

a fiber including a gain medium disposed between said first and second cavity ends;

a pump signal injector connected to introduce pump light into said fiber toward said first cavity end, said pump light exciting said gain medium to produce a laser signal;

a saturable absorber proximate said first cavity end, said saturable absorber inducing modelocking of said laser signal; and an output coupler proximate said second cavity end and outcoupling a portion of said laser signal in the form of short output pulses.

2. The optical cavity of claim 1, in which said output coupler comprises a polarizing element.

3. The optical cavity of claim 1, further comprising first and second Faraday rotators respectively proximate said first and second cavity ends and compensating for polarization drifts.

4. The optical cavity of claim 1, further comprising a lens proximate said first cavity end and between said saturable absorber and said fiber.

5. The optical cavity of claim 1, in which said saturable absorber is disposed directly on said first reflector.

6. The optical cavity of claim 1, in which said gain medium comprises a rare earth element.

7. The optical cavity of claim 6, in which said rare earth element is erbium or ytterbium.

8. The optical cavity of claim 1, in which said pump signal injector comprises a wavelength division multiplexer.

9. The optical cavity of claim 1, additionally comprising a polarizer proximate said second cavity end.

10. The optical cavity of claim 1 wherein said saturable absorber removes a first percentage of light proximate to one end of said cavity, and said output coupler removes a second percentage of light proximate to the other end of said cavity, and wherein said first percentage is less than said second percentage.

11. The optical cavity of claim 10 wherein said first percentage is between 10 and 60 percent, and wherein said second percentage is above 60 percent.

12. An optical cavity for a short pulse modelocked fiber laser, comprising:

first and second reflectors which are each at least partially reflecting, respectively defining first and second ends of said cavity;

a fiber including a gain medium disposed between said first and second cavity ends;

a pump signal injector connected to introduce pump light into said fiber, said pump light exciting said gain medium to produce a laser signal;

a saturable absorber proximate said first cavity end, said saturable absorber inducing modelocking of said laser signal; and a polarizing output coupler proximate said second cavity end and outcoupling a portion of said laser signal in the form of short output pulses.

13. The optical cavity of claim 12, in which said polarizing output coupler comprises a polarization beam splitter.

14. The optical cavity of claim 12, further comprising first and second Faraday rotators respectively proximate said first and second cavity ends and compensating for polarization drifts.

15. The optical cavity of claim 12, further comprising a lens proximate said first cavity end and between said saturable absorber and said fiber.

16. The optical cavity of claim 12, in which said saturable absorber is disposed directly on said first reflector.

17. The optical cavity of claim 12, in which said gain medium comprises a rare earth element.

18. The optical cavity of claim 17, in which said rare earth element is erbium or ytterbium.

19. The optical cavity of claim 12, in which said pump signal injector comprises a wavelength division multiplexer.

20. The optical cavity of claim 12, in which said pump signal injector introduces said pump light into said fiber toward said first cavity end.

21. The optical cavity of claim 12 wherein said saturable absorber removes a first percentage of light proximate to one end of said cavity, and said output coupler removes a second percentage of light proximate to the other end of said cavity, and wherein said first percentage is less than said second percentage.

22. The optical cavity of claim 12 wherein said first percentage is between 10 and 60 percent, and wherein said second percentage is above 60 percent.

23. A method of generating short pulses from a fiber laser, wherein said fiber laser includes (a) a fiber having a gain medium, said fiber disposed between said first and second cavity ends, (b) first and second reflectors which are each at least partially reflecting, respectively defining said first and second cavity ends, and (c) a pump signal injector connected to introduce pump light into said fiber, said pump light exciting said gain medium to produce a laser signal, comprising:

absorbing a portion of said laser signal proximate said first cavity end to modelock said laser signal;

connecting said pump signal injector to inject said pump light toward said first cavity end; and outputting a portion of said laser signal proximate said second cavity end in the form of short output pulses.

24. The method of claim 23, in which said output step additionally comprises polarizing said short output pulses.

25. The method of claim 23, further comprising compensating for polarization drifts within said fiber.

26. The method of claim 23, further comprising focusing said laser signal proximate said first cavity end.

27. The method of claim 23, additionally comprising wavelength division multiplexing said laser signal and said pump signal.

28. The method of claim 23, additionally comprising polarizing said laser signal proximate said second cavity end.

29. The method of claim 23 wherein said absorbing step removes a first percentage of light proximate to one end of said cavity, and said outputting step removes a second percentage of light proximate to the other end of said cavity, and wherein said first percentage is less than said second percentage.

30. The method of claim 28 wherein said first percentage is between 10 and 60 percent, and wherein said second percentage is above 60 percent.

31. A method of generating short pulses from a fiber laser, wherein said fiber laser includes (a) a fiber having a gain medium, said fiber disposed between said first and second cavity ends, (b) first and second reflectors which are each at least partially reflecting, respectively defining said first and second cavity ends, and (c) a pump signal injector connected to introduce pump light into said fiber, said pump light exciting said gain medium to produce a laser signal, comprising:

absorbing a portion of said laser signal proximate said first cavity end to modelock said laser signal; and polarizing a portion of said laser signal proximate said second cavity end to output short pulses from said cavity.

32. The method of claim 31, further comprising compensating for polarization drifts within said fiber.

33. The method of claim 31, further comprising focusing said laser signal proximate said first cavity end.

34. The method of claim 31, additionally comprising wavelength division multiplexing said laser signal and said pump signal.

35. The method of claim 31 wherein said absorbing step removes a first percentage of light proximate to one end of said cavity, and said polarizing step removes a second percentage of light proximate to the other end of said cavity, and wherein said first percentage is less than said second percentage.

36. The method of claim 31 wherein said first percentage is between 10 and 60 percent, and wherein said second percentage is above 60 percent.

37. A method of producing modelocked laser output pulses from a fiber laser optical cavity, comprising:

injecting pump light into said fiber laser to generate a laser signal;

absorbing a portion of said laser signal to modelock said laser signal;

outcoupling a fraction of said laser signal to produce said output pulses; and distributing optical losses within the cavity by undertaking said absorbing and outcoupling steps at opposite ends of said cavity, to enhance the power of said output pulses.

38. The method of claim 37, in which said distributing step does not substantially increase the pulse width of pulses from the modelocked laser signal.

39. An optical cavity for a modelocked fiber laser, comprising:

two reflectors, each at least partially reflecting, said reflectors defining opposite ends of said cavity;

a fiber including a gain medium disposed between said opposite ends of said cavity;

an optical element for injecting a pump signal into said cavity, the pump signal exciting said gain medium in said fiber to produce a laser signal;

a saturable absorber for modelocking said laser signal; and an output coupler for outcoupling a portion of said laser signal, said output coupler and said saturable absorber located within and on said opposite ends of said cavity.

40. An optical cavity as defined in claim 39, wherein said output coupler polarizes said laser signal.

41. An optical cavity as defined in claim 40, wherein said output coupler comprises a polarization beam splitter.

42. An optical cavity as defined in claim 39 wherein said optical element injects said pump signal in a direction away from said output coupler.

43. An optical cavity as defined in claim 39 additionally comprising:

a pair of Faraday rotators within said cavity to compensate for polarization drift.

44. A method of producing modelocked laser output from an optical cavity having a gain medium, comprising:

amplifying an optical signal in said gain medium to produce an amplified optical signal;

directing said amplified optical signal through a saturable absorber to produce a modelocked optical signal;

amplifying said modelocked optical signal in said gain medium to produce an amplified modelocked optical signal; and outcoupling a fraction of said amplified modelocked optical signal with a polarizing element.

45. A method of producing modelocked laser output from an optical cavity having a gain medium, comprising:

pumping said gain medium with pump light having a first direction;

amplifying an optical signal in said gain medium to produce an amplified optical signal;

directing said amplified optical signal through a saturable absorber to produce a modelocked optical signal;

amplifying said modelocked optical signal by passing said modelocked optical signal through said gain medium in a direction opposite said first direction to produce an amplified modelocked optical signal; and outcoupling a fraction of said amplified modelocked optical signal.

* * * * *